(12) United States Patent
Milton et al.

(10) Patent No.: US 11,968,238 B2
(45) Date of Patent: *Apr. 23, 2024

(54) POLICY MANAGEMENT SYSTEM TO PROVIDE AUTHORIZATION INFORMATION VIA DISTRIBUTED DATA STORE

(71) Applicant: Hewlett Packard Enterprise Development LP, Spring, TX (US)

(72) Inventors: Antoni Milton, San Jose, CA (US); Pattabhi Attaluri, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,193

(22) Filed: Aug. 30, 2022

(65) Prior Publication Data
US 2022/0417288 A1 Dec. 29, 2022

Related U.S. Application Data (63) Continuation of application No. 16/419,138, filed on May 22, 2019, now Pat. No. 11,463,477.

(51) Int. Cl.
*H04L 9/40* (2022.01)
*G06F 16/27* (2019.01)
(Continued)

(52) U.S. Cl.
CPC .............. *H04L 63/20* (2013.01); *G06F 16/27* (2019.01); *H04L 41/0893* (2013.01);
(Continued)

(58) Field of Classification Search
CPC . H04L 63/20; H04L 41/0893; H04L 63/0263; H04L 63/0892; H04L 69/24;
(Continued)

(56) References Cited

U.S. PATENT DOCUMENTS 8,763,088 B2 6/2014 Chua et al.
10,193,878 B2 1/2019 Venkatanaranappa et al.
(Continued)

OTHER PUBLICATIONS

Clearpass 6.7.5, (Research Paper), Retrieved Jan. 23, 2019, 118 Pgs.
(Continued)

*Primary Examiner* — Cheng-Feng Huang
(74) *Attorney, Agent, or Firm* — Hewlett Packard Enterprise Patent Department (57) ABSTRACT

A distributed policy management (PM) system (e.g., system for authentication, authorization, and accounting (AAA) activities on a network) is provided. Nodes of the PM system may share information of the PM system using a distributed data store (e.g., a multi-master cache). Each node of the distributed PM system may further share information from the distributed data store with other nodes of a corporate infrastructure network by augmenting information in a remote authentication dial-in user service (RADIUS) protocol message. Nodes that are involved in policy management (e.g., network authentication server (NAS) or firewall) without access to the distributed data store may receive information via augmented RADIUS messages. In this manner, devices may be interfaced to the distributed PM system without having access to the distributed data store. High availability and load balancing implementations may be provided by leveraging the distributed data store across nodes of the PM system.

20 Claims, 8 Drawing Sheets

(51) Int. Cl.
  *H04L 41/0893* (2022.01)
  *H04L 69/24* (2022.01)
  *H04L 67/1097* (2022.01)
  *H04L 67/56* (2022.01)
(52) U.S. Cl.
  CPC ...... *H04L 63/0263* (2013.01); *H04L 63/0892* (2013.01); *H04L 69/24* (2013.01); *H04L 63/02* (2013.01); *H04L 67/1097* (2013.01); *H04L 67/56* (2022.05)
(58) Field of Classification Search
  CPC ..... H04L 63/02; H04L 67/1097; H04L 67/56; G06F 16/27
  See application file for complete search history.

(56) References Cited

U.S. PATENT DOCUMENTS

| | | | |
|---|---|---|---|
| 10,417,849 B2 | 9/2019 | Fedronic et al. | |
| 10,454,940 B2 | 10/2019 | Lander et al. | |
| 10,547,614 B2 | 1/2020 | Gibbons et al. | |
| 10,755,279 B2* | 8/2020 | Gilboy | H04L 63/08 |
| 10,805,383 B2 | 10/2020 | Schincariol et al. | |
| 2006/0233180 A1* | 10/2006 | Serghi | H04L 67/56 |
| | | | 370/401 |
| 2007/0206515 A1* | 9/2007 | Andreasen | H04L 65/1016 |
| | | | 370/255 |
| 2009/0132543 A1* | 5/2009 | Chatley | H04L 67/1001 |
| 2014/0115279 A1 | 4/2014 | Chirca et al. | |
| 2015/0163158 A1* | 6/2015 | Ryland | H04L 47/70 |
| | | | 709/225 |
| 2016/0006693 A1 | 1/2016 | Salcedo | |
| 2016/0112429 A1 | 4/2016 | Sundaresan et al. | |
| 2016/0205557 A1 | 7/2016 | Tuupola et al. | |
| 2017/0093872 A1* | 3/2017 | Braksator | H04L 63/102 |
| 2017/0331832 A1* | 11/2017 | Lander | H04L 63/102 |
| 2018/0183793 A1 | 6/2018 | Mandadi et al. | |
| 2018/0288048 A1* | 10/2018 | Gibbons | H04L 63/102 |
| 2019/0089705 A1* | 3/2019 | Chud | H04L 63/102 |
| 2019/0199782 A1* | 6/2019 | Schincariol | H04L 41/0806 |
| 2019/0238550 A1 | 8/2019 | Zhang et al. | |
| 2020/0067907 A1 | 2/2020 | Avetisov et al. | |

OTHER PUBLICATIONS

Clearpass Policy Manager 6.2, (Research Paper), Retrieved Jan. 23, 2019, 368 Pgs.

Configure External Radius Sewers on ISE, (Research Paper), Apr. 23, 2018, 11 Pgs.

Configure Integrated Clearpass Authentication and Enforcement, (Research Paper), Dec. 11, 2018, 29 Pgs.

Configuring Authentication, Authorization, and Accounting Functions, (Research Paper), Retrieved Jan. 23, 2019, 30 Pgs.

* cited by examiner

POLICY MANAGEMENT SYSTEM TO PROVIDE AUTHORIZATION INFORMATION VIA DISTRIBUTED DATA STORE

BACKGROUND

Authentication, Authorization, and Accounting (AAA) are capabilities supplied by network security protocols to restrict, enable, and monitor access to services and resources across a networked cluster or distributed network of services. Authentication is the function by which security providers ensure that the identities of users or devices attempting to access network resources have been recognized and verified as genuine. This assurance may be provided via the presentation of identifying credentials and may be performed via the Extensible Authentication Protocol (EAP) over LAN (EAPoL), EAPoL is a network port authentication protocol used in the Port Based Network Access Control standard provided by the Institute of Electrical and Electronics Engineers (e.g., IEEE 802.1X standards). Authorization function generally used to determine a scope or role of allowable access of a specific network resource by a user with an authenticated identity (e.g., authenticated to a network via a network authentication server (NAS)). After an entity is authenticated and authorized for specific resource(s) a session may be established for that user and device. Accounting functions represent a means of tracking activities of users in established sessions. Established sessions may further allow for gathering of statistical data for different purposes (e.g., network monitoring, usage tracking, analysis, and other reasons). The Remote Authentication Dial-In User Service (RADIUS) is a networking protocol which provides all three of these AAA functions using a standard interface. RADIUS is supported by many different hardware and software vendors and controlled based on Internet Engineering Task Force (IETF) standards.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not perform serial processing and therefore those functions may be performed in an order different than shown or possibly in parallel with each other. For a detailed description of various examples, reference will now be made to the accompanying drawings, in which.

DETAILED DESCRIPTION

Illustrative examples of the subject matter claimed below will now be disclosed. In the interest of clarity, not all features of an actual implementation are described for every example implementation in this disclosure. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Systems developed to handle AAA for users, such as those implementing the RADIUS protocol, may use reliable storage mechanisms to maintain and share information on known users (e.g., authenticated users) and their assigned roles. One such system that handles AAA is a Lightweight Directory Access Protocol (LDAP) server. AAA systems generally store information on user sessions and recognized user roles at runtime. AAA systems may also provide accounting of user sessions (e.g. using an authentication database). In some implementations, proxy servers may act as a bridge between isolated network components (e.g., different subnets of a larger corporate network) to assist in centralized administration and propagation of information to other instances of the devices understanding the same network protocol, such as RADIUS. Using a standard protocol, such as RADIUS, further allows a heterogenous network of devices provided by multiple vendors concurrently. For example, forwarding or rewriting packets of the standard protocol using the same well-defined interfaces described in said protocol may allow different vendor devices to function collectively.

AAA systems, such as RADIUS, may also be made highly available (e.g., configured for redundancy) to provide reliable accessibility of the services and resources they provide in the event of a single device failure. High availability (HA)

is a characteristic which, at a composite view, attempts to ensure that a system, service or resource remains functional and accessible, with maximal uptime and a lower likelihood of downtime in the event of single points of failure experienced by individual components of said system. Another aspect that may be provided in concert with HA is a distributed resource characteristic that further allows the system, service, or resource to be widely accessible across a given enterprise. These goals of HA and distributed access may be accomplished via distribution of acting components and/or distribution of information of state both for access and modification. Distribution of state for both access and modification allows current information to be reflected across the distributed system in a timely manner (e.g., cluster information sharing, distributed database, etc.). The choices made for the supporting infrastructure of a network security protocol providing AAA functions, such as RADIUS, may be customized for different implementations and rely on components from multiple vendors.

Implementations of network security protocols, such as RADIUS, typically provide their functions of authentication, authorization and accounting (AAA) via standard interfaces defined by the protocol. RADIUS and other network protocols may offer defined interfaces to enable handshaking between external actors (e.g., other systems of a corporate network) and the systems used to provide AAA functions. In addition to any pre-defined interfaces (e.g., device consumer handshakes) for the system providing AAA functionality, this disclosure provides a means of retrieval and modification of the resulting information of state. Thus, an improvement to traditional computer networks may be provided to interface between networked systems that are targeted for consumption and peripheral systems that may further process this shared information within the larger enterprise. Specifically, example implementations may allow for sharing information from a PM system and other systems (e.g., firewalls) that may benefit from additional information provided with respect to corporate network policies (e.g., policies provided by the PM system).

Disclosed implementations for retrieval of changes to information maintained through AAA functions performed by a PM server include using a shared memory cache referred to herein as a "multi-master cache" (MMC). The MMC may be propagated to different computing devices, working collectively to provide a comprehensive policy management for an organization. As mentioned above, the policy management functions include controlling access capabilities (e.g., security) for network services within the organizations corporate network.

In general, there may be devices on the corporate network that are consuming devices (e.g., user devices or subscribing devices). User devices may represent lap-tops, tablets, desktops, etc. Subscribing devices may represent application servers or compute resources providing overall functionality (e.g. computer applications) to support corporate operations via the devices communicatively coupled to the corporate network. Each of these consuming deices may interact with each other and with providing devices (e.g., participants providing the PM functionality) using a networking protocol, such as RADIUS. Each participant providing the PM functionality may share information via RADIUS (or another network protocol) and by using the MMC. Using an MMC that is distributed may allow PM functionality to be distributed across a cluster to become highly available for the corporate network. Implementations are not limited to a cluster for HA, but a cluster is just one manner of providing redundancy.

A cluster will be used in the example implementations of this disclosure, however, other techniques for HA are possible and will be understood by one of ordinary skill in the art, given the benefit of this disclosure. Specifically, a traditional primary and backup role for two servers providing PM functionality is another example implementation for HA. In any case, multiple servers working collectively to provide an HA solution may do so by using the disclosed MMC to share information and allow multiple devices to have access to a current set (e.g. changes to dynamic information are propagated automatically) of information to perform their intended function.

In a cluster implementation, the MMC may operate as a repository for nodes of a PM cluster to store dynamic information, which can then be automatically propagated (based on changes) throughout each of the nodes of the cluster so that each of the nodes is kept current and redundancy of data access is provided for high availability. Further each of the devices sharing the current information (e.g., via the MMC) may allow information to be accessed by consumer device using backend channels that are not necessarily defined by any specific protocol standard (e.g., RADIUS). In short, extensions to the standard may be provided that allow for augmentation of available data without "breaking" standard compliant interfaces.

In disclosed implementations, the capability to provide PM functionality may use established network security protocol(s), such as RADIUS, for establishing and sharing AAA information. One method of establishing and sharing AAA information may include the handshake interfaces discussed throughout this disclosure. Sharing may occur between the providing devices (e.g., using RADIUS or MMC access) and may also be provided to resources (e.g., consuming devices) that utilize the AAA information. Examples of consuming devices include, but are not limited to application services, compute resources, and firewalls. Consuming devices may not have direct access to MMC but may be able to access current data indirectly via the MMC. That is, they may interact (e.g., via handshake or other interface) with a distributed component providing the PM functionality that has direct access to the MMC. One advantage of this type of implementation is to provide a lose coupling to any one protocol and further allow proprietary access (e.g., access not based on an industry standard) to this information without being limited to or interfering with functionality provided based on an industry standard. Accordingly, access to AAA information may be streamlined, enhanced, and made available using techniques that would otherwise not be available (e.g., not provided by any standard).

Using an MMC may allow for updating the AAA information in at least two manners. For example, AAA information may be maintained in an MMC and updates may be provided to non-MMC devices (e.g., firewall) using a protocol, such as RADIUS. Additionally, AAA information updates may be provided to MMC devices via a distributed shared data store. Of course, it may also be possible to provide update to MMC devices in manners other than by using the MMC capability. In general, updates may be made to the shared data store (MMC) as an integrated function of successful acknowledgement of any attempted handshake interface. In one example, MMC updates may occur prior to reporting success/failure of the handshake back to an initiator of that attempted handshake. Once updated in a local data store associated with the component device performing the handshake, any changes to data may be automatically propagated (e.g., shared or distributed) to the other component devices that were not directly participating in this instance of a handshake. Thus, the data store on the remaining nodes of the cluster that represents their local version of the MMC may be maintained with current information.

In general, propagation of information may apply for any handshake operation that resulted in addition, modification, or deletion of resulting information of state with respect to PM functionality. In this context, information of state refers to authentication state with respect to users or end-user devices based on interactions with a corporate infrastructure network. Interactions may include requests to authenticate to the corporate network or to access any application services provided as part of the overall secure corporate infrastructure. In one example of implementation using RADIUS, identity and role information of a particular user and assigned session resulting from a successful Access-Request call may be updated to the MMC prior to replying with an Access-Response. Additionally, Accounting-Stop responses may not be sent prior to performing a deletion of the associated AAA information of state. Accordingly, changes may be independently propagated across the MMC to be available to members of a cluster or other compute resources implementing PM functionality using the MMC (e.g., the shared and propagated data store).

In general, disclosed implementations may utilize several different functional flows (e.g., handshakes) to share information. A first flow of information may be between two PM nodes of a distributed PM implementation. In this first flow, a first PM node may (after authentication at a possibly different node) derive (e.g., fetch or obtain via query) authorization attributes (e.g., for the newly authenticated user) from a data base of rules (e.g., policy rules). Then, the first PM node may update/insert (into the MMC, as an example), a record that reflects the derived authorization attributes. In one specific example, when user BOB authenticates, the database may identify BOB as having a role of "student." Then, an association of BOB to student role may be inserted into the MMC.

A second flow of information may be between an NAS and a PM node and reflect an accounting request. In this second flow, an accounting request may be made by the NAS to obtain a station identification and frame IP address for a device associated with user BOB. A third functional flow may be between nodes of a distributed PM implementation (e.g., like the first functional flow discussed above). This third functional flow may possibly take place after the accounting request of the second flow and represent a node performing a query to the MMC for user BOB. Then, an update of account information for user BOB may be made based on the information obtained in the second flow. The updated account information may then be shared throughout nodes of the distributed PM using an update to the MMC. Finally, a fourth example flow may be between a node of a distributed PM implementation and a firewall. In this flow a node of the distributed PM may use a RADIUS-based message to provide information (e.g., information that was obtained from the MMC) to the firewall. Other flows are possible, the intent of these examples is to explain that information may be shared between distributed nodes of a PM implementations via the MMC. Leveraging the sharing capability, different nodes may interact with other network devices (e.g., firewall, PM database instance) to perform functions that may (e.g., in a non-distributed PM implementation) have been limited to a single device. Thus, further distribution of PM functionality (i.e., load-balancing) and HA (e.g., distributed redundancy) may be provided by disclosed implementations utilizing a distributed MMC as disclosed herein.

Figure 1:
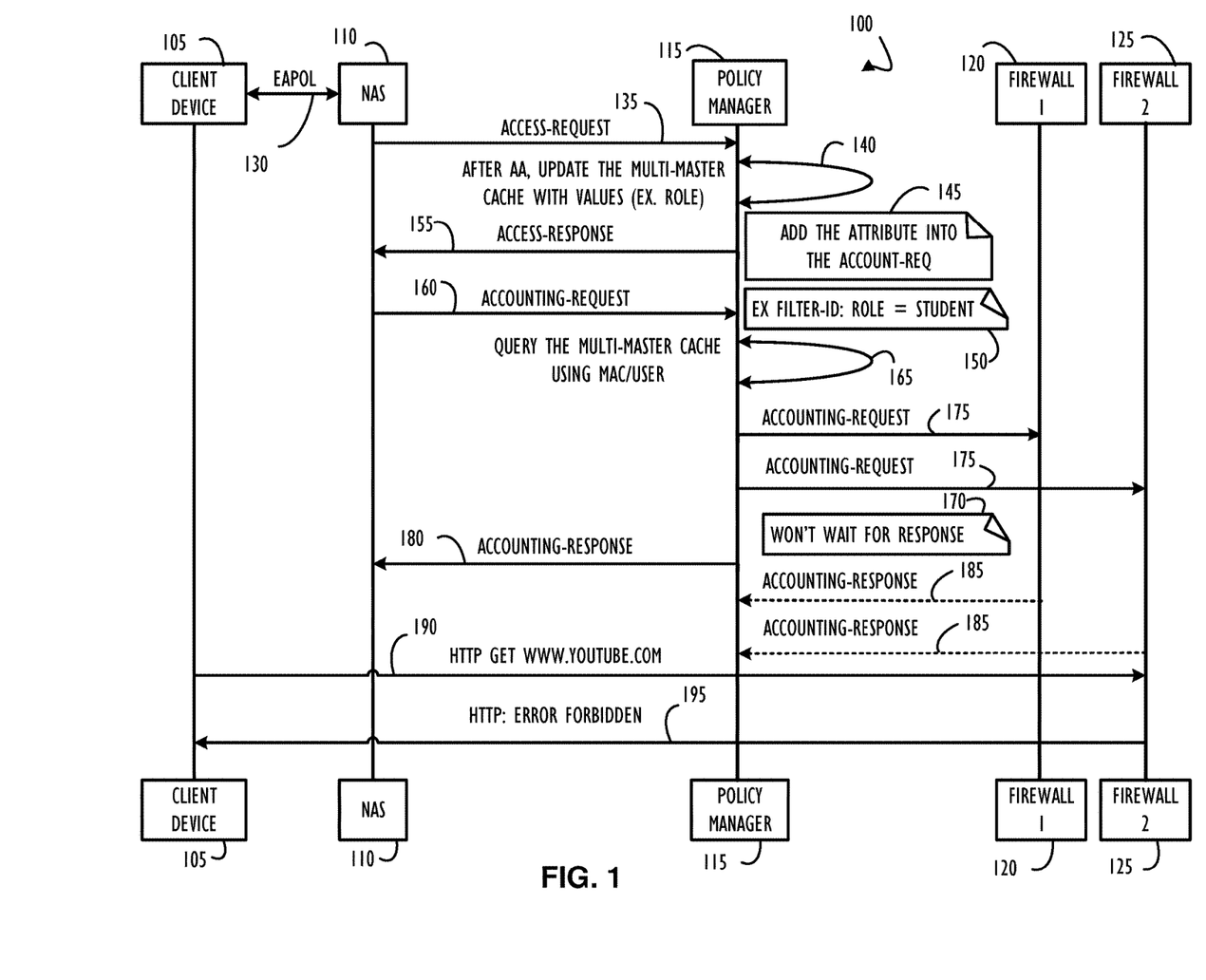
FIG. 1 illustrates a functional timeline diagram including example components (and actions of those components) for a system built using the RADIUS networking protocol and other protocols to share information from a policy manager (PM) with other devices in a network, according to one or more disclosed implementations.
Figure 2:
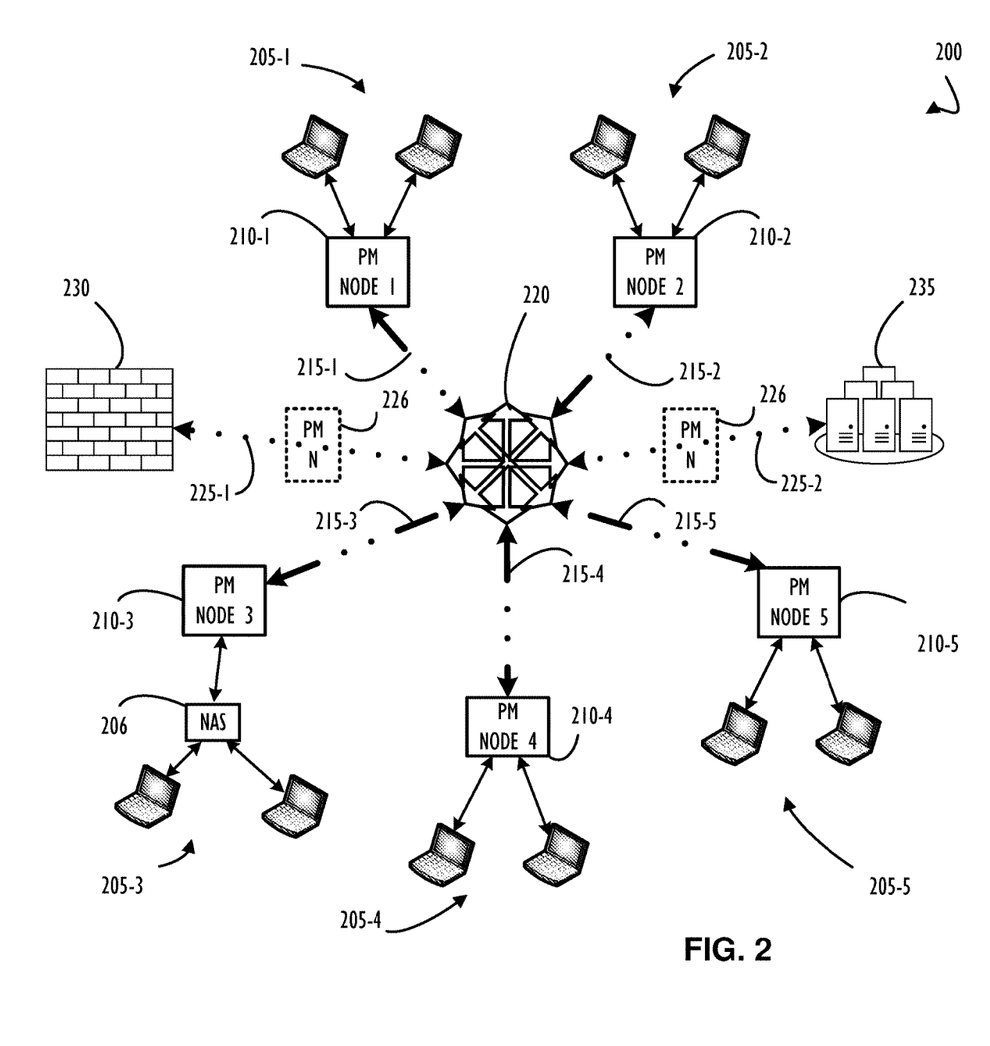
FIG. 2 is a block diagram illustrating one possible relationship between multiple interacting resources within a cluster providing AAA functions to distributed instances of an example PM implementation, according to one or more disclosed implementations.
Figure 3:
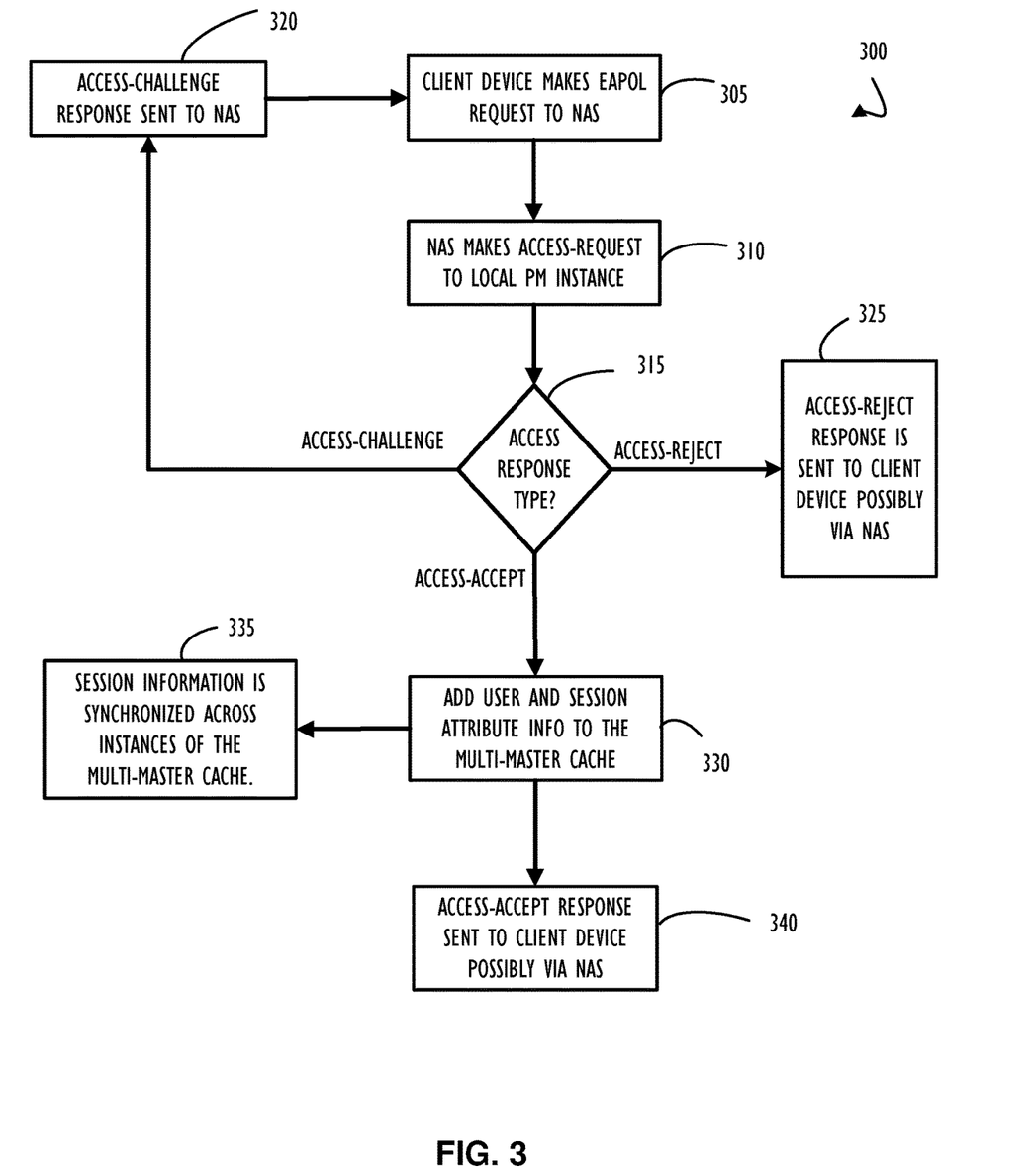
FIG. 3 is a flow chart illustrating one possible process flow for a handshake method of an Access-Request function and includes updating results of a corresponding Access-Accept response, according to one or more disclosed implementations.
Figure 4:
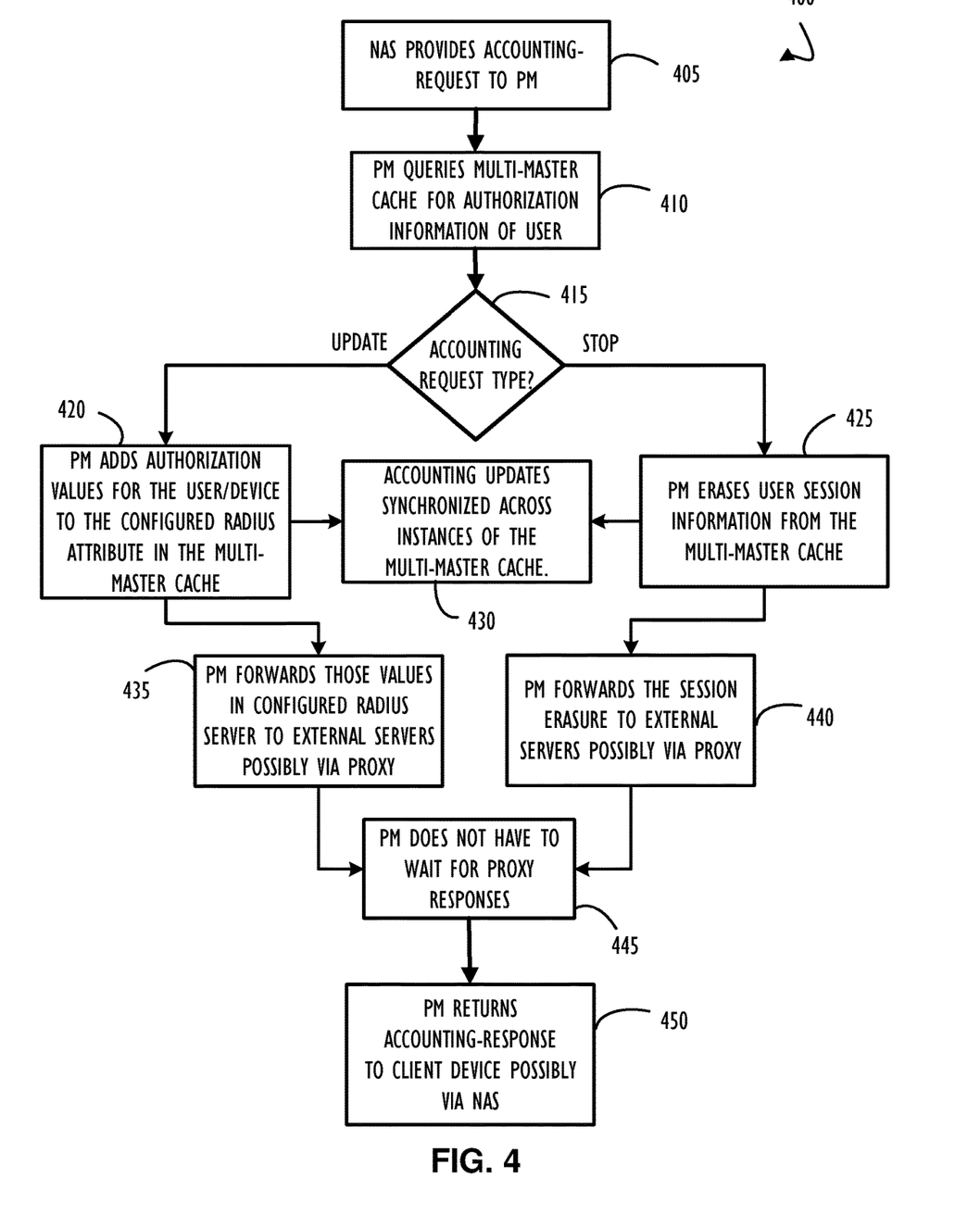
FIG. 4 is a flow chart illustrating one possible process flow for a second handshake method representing an Accounting-Request function and includes updating results of a corresponding Accounting-Response back to the requesting network device, according to one or more disclosed implementations.
Figure 5:
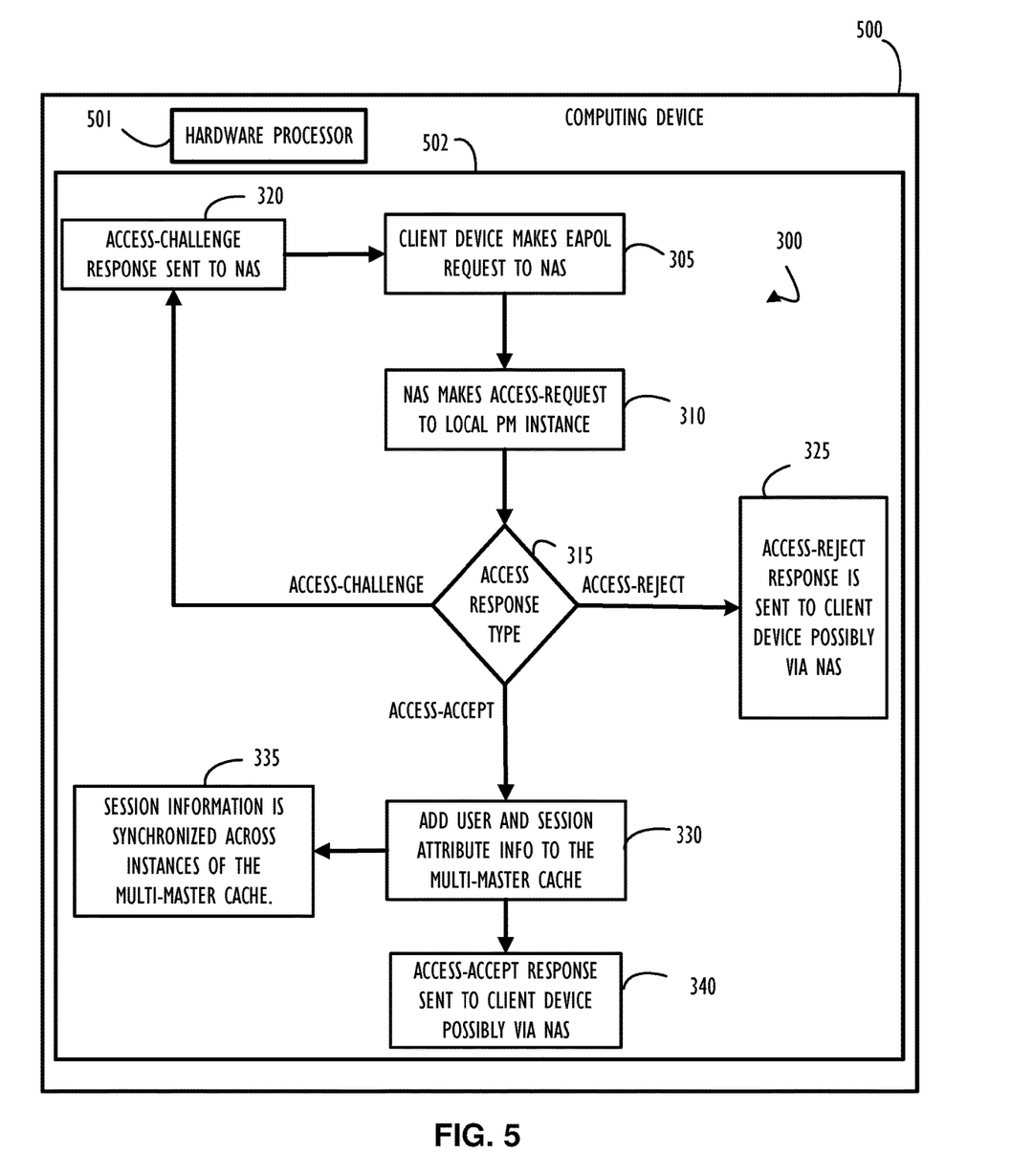
FIG. 5 illustrates an example processor and computer-readable medium to implement the example method of FIG. 3, according to one or more disclosed implementations.
Figure 6:
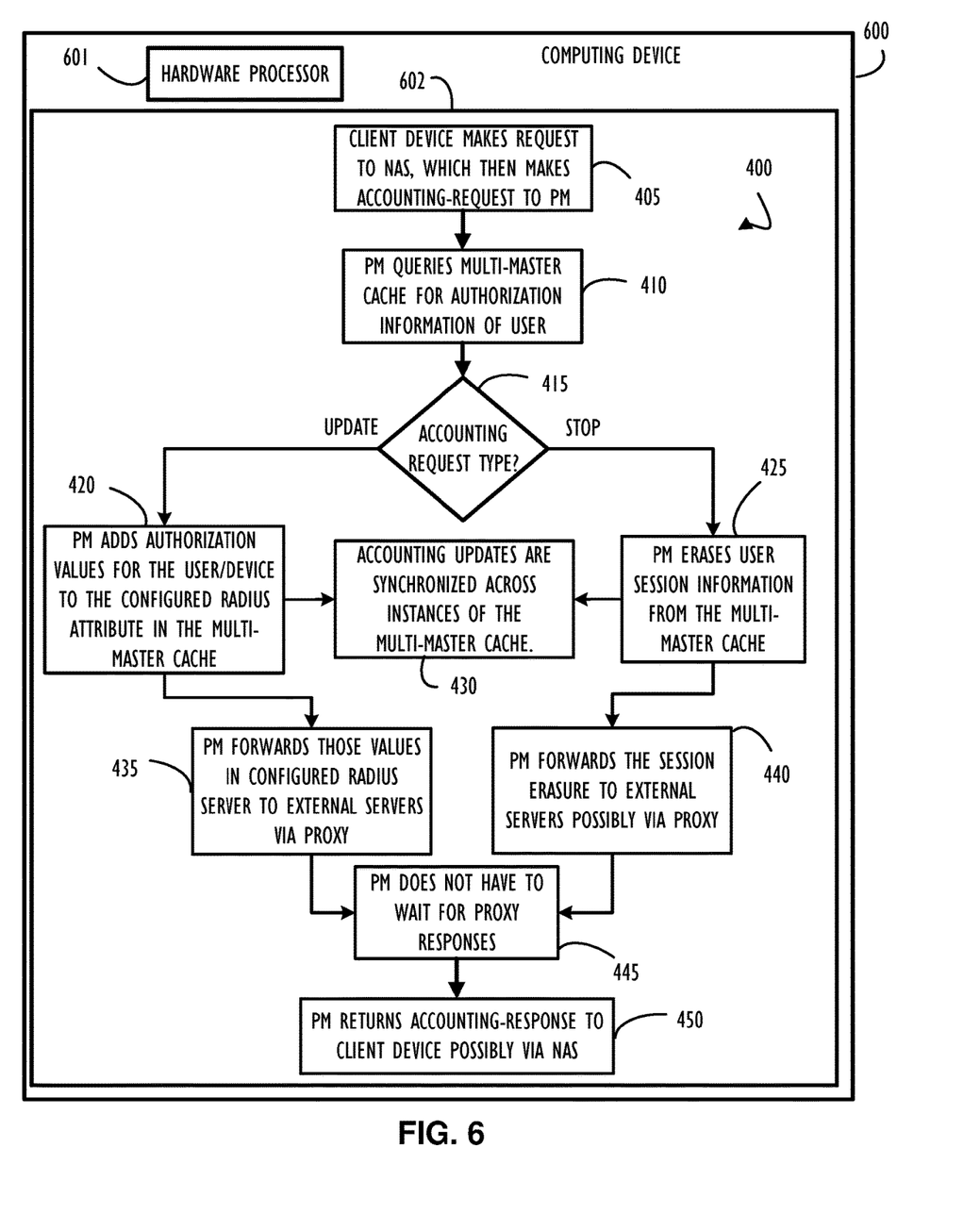
FIG. 6 illustrates an example processor and computer-readable medium to implement the example method of FIG. 4, according to one or more disclosed implementations.
Figure 7:
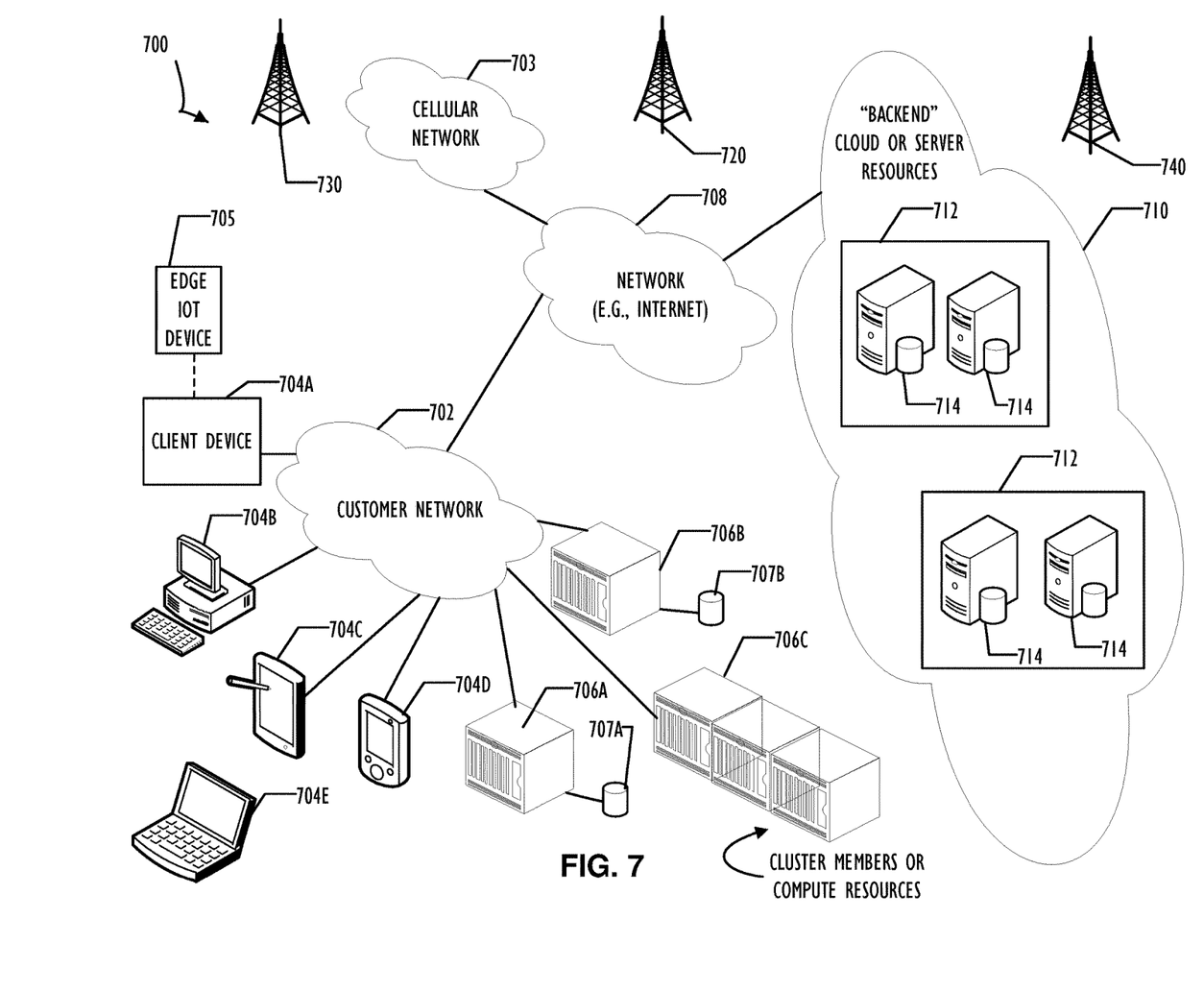
FIG. 7 illustrates an example computer network infrastructure that may be used to implement all or part of the disclosed techniques for updating AAA information via RADIUS to an external server from a PM, according to one or more disclosed embodiments.
Figure 8:
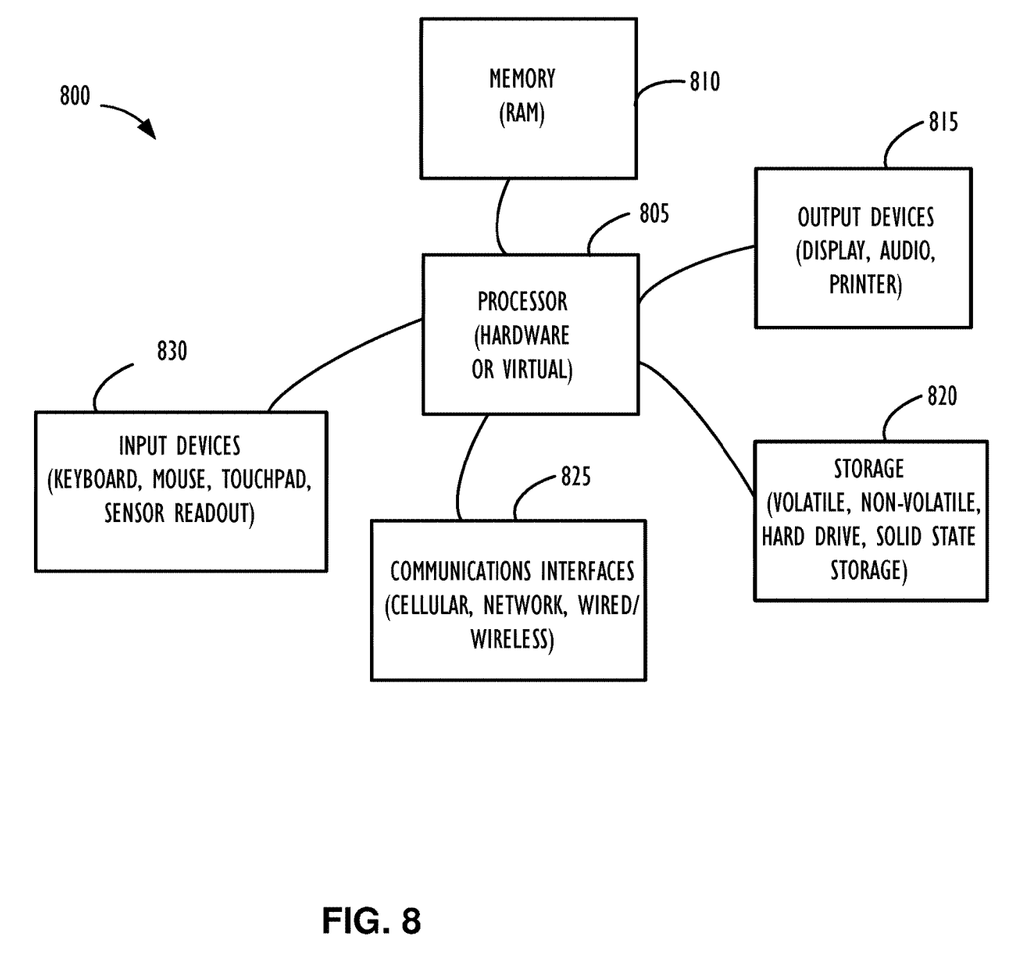
FIG. 8 illustrates a computing device that may be used to implement the functions, modules, processing platforms, execution platforms, communication devices, and other methods and processes of this disclosure.

Having an understanding of the above overview, this disclosure now explains one possible non-limiting example implementation (possible optional variants may also be included where applicable). This example implementation is explained with reference to the figures and represents only one possibility based on disclosed techniques. In FIG. 1, a functional block diagram illustrates relevant acting components of a system built upon the RADIUS networking protocol operating within the parameters of the standard protocol while further including a distributed in-memory cache technique to extend functionality without violating the standard. FIG. 2 then illustrates a functional block diagram to show possible relationships between connecting devices that may be administered by a PM system (e.g., a ClearPass Policy Manager as available from Hewlett Packard Enterprises). In one example, a PM may share augmented information via RADIUS interactions and maintain concurrency across a corporate network (e.g., cluster implementation of a PM) using a distributed multi-master cache (MMC). Thus, multiple network components may be concurrently aware of the relationship of other networked components by receiving their information of state from the MMC. FIG. 3 then illustrates a flow chart for an example method of a handshake (e.g., controlled device interaction such as challenge-response) for an Access-Request function. The Access-Request function may represent an interaction between a network device (e.g., client device) or cluster component based on the RADIUS networking protocol. Each different device participating in this handshake may have concurrency and availability of data required to implement policies of the PM via the distributed MMC. FIG. 4 then illustrates a flow chart for an example second handshake method (that may follow the first handshake) to provide an Accounting-Request function between a network device (e.g., the client device) or cluster component based on the RADIUS networking protocol. Again, each different device participating in this handshake may have concurrency and availability of data required to implement policies of the PM via the distributed MMC. FIGS. 5-6 illustrate non-transitory computer readable mediums and a corresponding compute resource to implement disclosed methods. Finally, FIGS. 7-8 illustrate a possible corporate network infrastructure and processing device for components of the corporate network infrastructure, respectively. FIGS. 7-8 illustrate an environment where aspects of the current disclosure may be implemented to provide an improvement to the management, maintenance, security, availability, and overall performance/reliability of policy management for networked devices.

Referring now to FIG. 1, a functional timeline 100 is illustrated. Timeline 100 includes example acting components (e.g., client device 105, network authentication server (NAS) 110, PM 115, firewall 1 (120), and firewall 2 (125)). Collectively, these acting components may represent an example of a system built using the RADIUS networking protocol and other protocols to implement PM functionality to provide authorization and accounting information to an external server, according to one or more disclosed implementations. Although PM 115 is illustrated as a single box in FIG. 1, a distributed implementation may provide the functionality of PM 115. Events of Timeline 100 are illustrated from top to bottom and interactions are illustrated as left to right and right to left arrows.

Timeline 100 begins at the top left where client device 105 first makes a connection to NAS 110 using the Extensible Authentication Protocol over LAN (EAPoL) as indicated by bi-directional arrow 130. As mentioned above, EAPoL is defined in the Institute for Electrical and Electronics Engineers (IEEE) Standard for Port-Based Network Access Control (PNAC) and generally identified in the industry by the acronym and enumeration IEEE 802.1X. NAS 110 may determine a proper response to the EAPoL request via arrow 130 by first (or concurrently) sending an Access-Request as indicated by arrow 135 to PM 115. In this example, the Access-Request associated with arrow 135 represents a request for authentication. If PM 115 is able to verify the identity of client device 105, an update (as indicated by loop 140) may be made to the MMC (e.g., the node servicing the Access-Request associated with arrow 135 may update a local instance of an MMC) with appropriate values related to authorization of access. The appropriate values may include a role of a user currently associated with client device 105 or other privileges that may be verified/identified via an authentication/authorization process as provided by NAS 110 and PM 115. In this example, attributes may be added (indicated by note 145) to the account request in the MMC. One example attribute (as indicated by note 150) is a role of a "STUDENT." In some implementations, the update indicated by loop 140 may be with respect to attributes added to an MMC may be made before any responses are given to client device 105. Responsive to a successful update to the MMC by PM 115, an Access-Response as indicated by arrow 155 may be returned to NAS 110. NAS 110 may then communicate the response (not shown for simplicity) back to client device 105. The response to the client may include information regarding the session assigned to now-authenticated client device 105 and an associated user.

At this stage of timeline 100, in one example, client device 105 is now authenticated and client device 105 may perform functions on a corporate network based on instantiated session information. Additionally, NAS 110 may communicate Accounting-Request as indicated by arrow 160 to PM 115. Accounting-Requests may be associates with tracking or permitting user interactions (e.g., authentication or access requests) of a client device (e.g., client device 105) and an associated user. Initially an Accounting-Request may be associated with EAPoL 130 as part of (or in response to) an initial network authentication activity. Subsequent to authentication, Accounting Requests may be associated with an attempt by client device 105 to access a specific service or resource on the corporate network.

In this example the corporate network is secured and managed by PM 115. Responsive to an Access-Request, PM 115 may initiate query 165 to obtain information from the MMC (e.g., a query based on a MAC address of client device 105 or a query based on user identification, a query based on user/device role, or a query based on a combination thereof). Query 165 may be used to determine if client device 105 (and possibly an associated user) has access to the targeted service or resource. PM 115 may then forward an Accounting-Request as indicated by arrow 175 to another computing device. Importantly, note that in a distributed PM implementation of PM 115, a first node may perform functionally associated with the Accounting-Request associated with arrow 160 while a second different node may initiate the Accounting-Requests associated with arrows 175 (note one to firewall 1 (120) and another to firewall 2 (125)). Further, different nodes of a single distributed PM 115 may interact with firewall 1 (120) and firewall 2 (125) concurrently. Thus, at least three nodes of a distributed implementation PM 115 may utilize a shard MMC to collectively perform the activities illustrated in timeline 100. Of course, less than three nodes are also possible and all activities of timeline 100 may be performed by a single node or any number of nodes. Each of the involved nodes may have access to the shared MMC to maintain a consistent distributed copy of PM information.

Continuing with timeline 100, Accounting-Responses as indicated by arrows 185 may be sent from firewall 1 (120) and firewall 2 (125) to PM 115. As indicated by note 170, it is possible that PM 115 will not wait for a response from each of the one or more firewalls. Instead, PM 115 may initiate a transmission (e.g., send) an Accounting-Response message as indicated by arrow 180. Note that the Accounting-Response message indicated by arrow 180 may be derived using information PM 115 has previously obtained (e.g., query response) from the MMC (e.g., as indicated by loop 165). The Accounting-Response message indicated by arrow 180 may be sent from PM 115 back to NAS 110, which may then (not illustrated in timeline 100) communicate the response (or information about the response) back to client device 105. In this manner, processing may be parallelized by utilizing information available in the MMC.

Completing the discussion of timeline 100, an HTTP GET request (as indicated by arrow 190) for a specific web site Universal Resource Locator (URL) may be made from client device 105. The result is a rejection in this example as firewall 2 (125) does not grant access to that URL. Rejection may be caused by a lack of proper authentication or because the role associated with user and/or client device 105 (as known by firewall 2 (125)) is not authorized to interact with that URL. In either case, rejection results in an HTTP: Error Forbidden response message as indicated by arrow 195 being sent back to client device 105.

Referring now to FIG. 2, an example networked system 200 is described by showing selected relationships between components of one example implementation of a PM system and other computer systems that may typically be found in a corporate network infrastructure, according to one or more disclosed implementations. Specifically, networked system 200 describes a PM system (e.g., PM nodes 1-5 (210-1 through 210-5)) implemented as a cluster with each PM node (210-1 through 120-5) of the distributed PM system having access to a distributed data store 220 (e.g., an MMC as described above). In this example, each PM node (210-1 through 120-5) of the distributed PM system may interact with other network devices (e.g., firewall 230 and application cluster 235) using a RADIUS protocol interface to provide information from the distributed data store 220.

As illustrated in networked system 200, multiple client devices 205 illustrated as interfacing with selected instances of PM nodes (210-1 through 210-5). Note that for the sake of clarity, the previously described NAS instance(s) are not exhaustively shown in networked system 200. One example NAS 206 is illustrated for PM node 3 (210-3) and other instances of PM nodes may be similarly configured. As explained above, NAS 206 may act as an intermediary network device between client devices 205-3 and PM Node 3 (210-3) and similar intermediary devices may exist to assist other PM nodes as desired. In networked system 200, client devices 205-1 interface with PM node 1 (210-1) and PM node 1 (210-1) may interface with distributed data store 220 via bi-directional link 215-1. Similarly, client devices 205-2 interface with PM node 2 (210-2) and PM node 2 (210-2) may interface with distributed data store 220 via bi-directional link 215-2. Each of client devices 205-4 and client devices 205-4 respectively interface with PM node 4 (210-4) and PM node 5 (210-5), which in turn utilize bi-directional links 215-4 and 215-5 (again respectively) to access distributed data store 220. Note, as discussed herein, it is possible that a given client device may interact with multiple different instances of a PM node at different points in time for a single authenticated session. That is, an instance of a client device may perform a first handshake interaction with a first instance of a PM node and may (within the same authenticated session) perform a second handshake interaction with a second, different instance of a PM node. Thus, load balancing may be achieved for PM functionality supporting multiple client devices within a corporate infrastructure network. Further, distributed data store 220 enhances the ability for PM functionality to be balanced, in part, because each instance of a PM node (210-1 through 210-5) maintains a consistent copy of information within distributed data store 220 (e.g., by using an implementation of an MMC as described herein).

FIG. 2 also illustrates a relationship between each instance of a PM node (210-1 through 210-5) and the distributed data store 220 that is accessible to each of PM nodes 201-1 through 210-5. Also note that dashed box of PM node N 226 appears two times in networked system 200 and is used to illustrate an indirect relationship (e.g., links 225-1 and 225-2) to data from distributed data store 220 from application cluster 235 and firewall 230 respectively. This indirect relationship has been described above and represents that, even though application cluster 235 and firewall 230 do not directly have access to distributed data store 220, information from distributed data store 220 may be provided via RADIUS protocol messages from an appropriate PM node to other nodes of networked system 200. Specifically, records within distributed data store 220 may be augmented with information maintained by a PM system and provided to the other nodes of networked system 200 that are equipped to understand RADIUS protocol messages. In this manner, information from a distributed PM system as illustrated in networked system 200 may be shared with nodes that do not have direct access to the distributed data store 220 (e.g., an MMC as described above).

In general, instances of each PM node 210-1 through 210-5 may treat distributed data store 220 as their backend data store and use an internal integration layer to propagate information throughout the cluster. Also, each instance of a PM node 210-1 through 210-5 may utilize a RADIUS protocol to provide propagation by proxy to all other nodes of networked system 200. Each instance of a PM node 210-1 through 210-5 may receive updates from other RADIUS implementations via proxy and propagate their own updates to other computer systems using implementations of RADIUS via proxy. However, when an instance of a PM node (e.g., PM node 2 (210-2)) desires to provide an update to another instance of a PM node (e.g., PM node 4 (210-4)), that update may be provided by propagation of data within distributed data store 220 (e.g., an MMC) which may represent a more efficient mechanism to share data than using RADIUS messages. Also note that although distributed data store 220 is illustrated as a central stand-alone entity in FIG. 2, this is done for illustrative purposes only (i.e., it is a logical representation). In an actual implementation of networked system 200, there may be no central repository because each instance of a PM node 210-1 through 210-5 may maintain a local synchronized copy of data in an internal (or locally accessible) memory for performance or other reasons.

Referring now to FIG. 3, a flowchart is illustrated to outline an example method 300 to allow a client device to make an authentication request (e.g., perform a handshake interaction as discussed herein), according to one or more disclosed implementations. Actions of example method 300 may be performed in a different order than those illustrated in FIG. 3 and some actions may possibly be performed in parallel. Example method 300 may utilize an implementation of RADIUS working together with a distributed PM functionality to augment capabilities typically available in a standard implementation using the RADIUS protocol. Example method 300 begins at block 305 where a client device (e.g., client device 105 of FIG. 1) may make an EAPoL request to an NAS (e.g., NAS 110 of FIG. 1) to authenticate. Block 310 indicates the NAS may further initiate an Access-Request call defined by RADIUS or some other network protocol to an instance of the example distributed PM implementation (illustrated, for example, as PM 115 of FIG. 1) operating within a cluster or other computing devices of an enterprise network. Recall, the distributed PM implementation provides security and monitors activities by devices and users within a corporate enterprise network (or other types of networks). Decision 315 indicates that a response to the Access-Request may be analyzed to determine different possible flow paths for example method 300.

If decision 315 determines the response of the PM node is an Access-Challenge type, flow continues to block 320. Block 320 indicates that the Access-Challenge response may be returned to the NAS and then communicated back to the appropriate client device returning to block 305. Upon a return from block 320, a client device may process the response to complete the authentication request based on the challenge. For example, a client device may alter information based on the challenge and attempt another request.

Alternatively, if decision 315 determines the response of the PM node, is an Access-Reject type, flow continues to block 325. At block 325, the Access-Reject response may be returned to the NAS and ultimately provided to the client device. In a typical implementation, an Access-Reject response returns a failure condition to the client device and ends an iteration of example method 300 in a failure state.

As a third possible determination from decision 315, if the response of the PM node represents an Access-Accept type response, then flow continues to block 330. As indicated in block 330, user and session information, such as role and other attributes used for authorization, may be updated in the shared distribute repository (e.g., the MMC). Flow out of block 330 has two possible paths that may be performed either serially or in parallel depending on a type of implementation of a PM node. Block 335 indicates that the user and session information may then be propagated to other PM nodes of the cluster via data propagation techniques that involve synchronization of the clustered in-memory cache. Serially or simultaneously to the processing of block 335, block 340 indicates that the Access-Accept response may be returned to the NAS and ultimately the client device. The NAS may simply forward an Access-Accept response or may process the Access-Accept response and send information indicating the authentication request has been granted, Receiving an access granted condition may allow the client device to continue with a requested operation (e.g., access to a service may be granted, access to a URL may be granted and information returned for that URL).

Referring now to FIG. 4, a flowchart is illustrated to explain an example method 400, in which an authenticated client device may have an associated one or more accounting requests processed by the example implementation of a distributed PM system. These one or more accounting requests may be processed, at least in part, using a RADIUS protocol to allow a PM system to interact with other computer devices that are available on a corporate network. Actions of example method 400 may be performed in a different order than those illustrated in FIG. 4 and some actions may be performed in parallel.

In the example method 400, a PM system may be implemented to leverage information propagated throughout the distributed PM system (e.g., available in a CCM) to further interact, via functions defined by the RADIUS protocol, with other computer system (e.g., firewalls). Example method 400 begins at block 405, where an NAS may periodically (or on demand) provide information to a distributed PM system (e.g., on behalf of an associated client device that is already authenticates to a network). These updates may continue until a client disconnects from the NAS. In general, post authentication, a client device may perform actions that result in an Accounting-Request, that may conform to a standard RADIUS protocol. Periodically (or on demand) an NAS may send accounting updates to a PM node of a distributed PM system. Flow continues to block 410, which indicates a PM node (e.g., of a distributed PM system) may query a local instance of a distributed data store that may be an implementation of a multi-master cache such as the MMC described above. The query may retrieve session information of a user that has authenticated via the NAS to a network at a particular end-user device. Block 415 indicates that the type of the Accounting-Request may either be to update information about a user session or to terminate a user session.

If the request is determined in decision 415 to be an update, then flow continues to block 420 where a PM node (which may be a different node than has interacted with this client previously for this particular user authentication session) may add authorization values (e.g., AAA information as discussed above) for the user. The authorization values may be added to a configured radius attribute as stored in an MMC. At block 420, there are two possible exit paths that may be performed in parallel or serially. Block 430 indicates that updates to an MMC may be propagated across all of the instances of an MMC (or other distributed data store) within the cluster or distributed PM implementation. Block 435 indicates that a PM node may also propagate those same updates (or a portion thereof in the same or a different format) to other connected devices via a network communication protocol (e.g., RADIUS) and may forward one or more Authorization-Requests via proxy. In this manner, information may be propagated to external servers that do not necessarily have access to an MMC. Block 445 indicates that the PM node does not have to wait for the responses to those proxy requests because they may be processed asynchronously to other actions. Of course, it is possible that the PM node may wait for an acknowledgement in some implementations. Flow then exits block 445 to arrive at block 450 where the PM node (or another node in the PM cluster) may return information about the Accounting-Response to the initially requesting client device. This return of information to the client device may optionally be sent directly to the client or, in some instances, may be sent via the NAS.

Returning to decision 415, If the request made to the PM node is determined to be a stop instruction (e.g., termination of activity or session), then flow continues to block 425. Block 425 has two different possible exit paths (similar to block 420 as discussed above) which may be performed in parallel or sequentially. As mentioned above block 430 indicates that updates to an MMC may be propagated across all of the instances of an MMC (or other distributed data store) within the cluster or distributed PM implementation. Block 440 indicates that a PM node may also propagate those same session shutdown updates (or a portion thereof in the same or a different format) to other connected devices via a network communication protocol (e.g., RADIUS). Shutdown updates may indicate a deletion of information about a terminated activity or session. Additionally, an instruction to erase session information may also be forwarded via proxy. In this manner, information may be propagated to external servers that do not necessarily have access to an MMC. Block 445 and block 450 complete the process of session update in a similar manner to that already discussed above.

FIG. 5 is an example computing device 500, with a hardware processor 501, and accessible machine-readable instructions stored on a machine-readable medium 502 for implementing the management of a distributed PM system, according to one or more disclosed example implementations. FIG. 5 illustrates computing device 500 configured to perform the flow of method 300 as an example. However, computing device 500 may also be configured to perform the flow of other methods, techniques, functions, or processes described in this disclosure. In this example of FIG. 3, machine-readable storage medium 502 includes instructions to cause hardware processor 501 to perform blocks 305-340 discussed above with reference to FIG. 3.

FIG. 6 is an example computing device 600, with a hardware processor 601, and accessible machine-readable instructions stored on a machine-readable medium 602 for implementing alternate techniques and methods associated with the above described distributed PM system, according to one or more disclosed example implementations. FIG. 6 illustrates computing device 600 configured to perform the flow of method 400 as an example. However, computing device 600 may also be configured to perform the flow of other methods, techniques, functions, or processes described in this disclosure. In this example of FIG. 4, machine-readable storage medium 602 includes instructions to cause hardware processor 601 to perform blocks 405-450 discussed above with reference to FIG. 4.

A machine-readable storage medium, such as 502 of FIG. 5 and 602 of FIG. 6, may include both volatile and non-volatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

FIG. 7 represents a computer network infrastructure 700 that may be used to implement all or part of the disclosed technique for distribution of user session information provided by AAA functions (e.g., a distributed PM system as discussed above) defined in a network security protocol, such as RADIUS via a highly available distributed in-memory cache (e.g., a CCM), or provide information flow between a system performing the disclosed techniques and other computer networks, according to one or more disclosed implementations. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include a network device supporting a distributed CCM data store such as that described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A. Client devices 704A-E may have one or more associated users (not shown) that may be authenticated to a network and access services that are managed by a PM system such as that described above.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices. Local compute resources 706A-C may also facilitate communication between other external applications, data sources (e.g., 707A and 707B), and services, and customer network 702. Compute resources 706A-C may be configured as a set of cluster nodes to collectively perform an application function.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames representing a scalable compute resource that may benefit from the techniques of this disclosure.

FIG. 8 illustrates a computing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A method comprising:
receiving, by a policy manager, a first accounting update for a client device from a network authentication server, wherein the policy manager and the network authentication server are associated with a network, and the client device has an existing user session with the network; and
responsive to the first accounting update, the policy manager to:
determine authorization information about the user session and update a configured Remote Authentication Dial-In User Service (RADIUS) attribute of a distributed data store based on the authorization information; and
send, as a proxy for a proxy target device external to the network, a second accounting update for the client device to the proxy target device, wherein the second accounting update comprises the authorization information and information from the first accounting update, wherein the proxy target device does not have access to the distributed data store.

2. The method of claim 1, wherein the policy manager comprises a plurality of nodes, and determining the authorization information comprises:
adding the authorization information to a distributed data store shared by the plurality of nodes.

3. The method of claim 2, wherein adding the authorization information comprises updating instances of the distributed data store associated with respective nodes of the plurality of nodes.

4. The method of claim 1, wherein:
the first accounting update corresponds to a first accounting-request message provided by the client device, and
sending the second accounting update comprises forwarding, by the policy manager, the first accounting-request message augmented by the authorization information.

5. The method of claim 4, further comprising:
providing, by the policy manager, a response to the first accounting-request message.

6. The method of claim 1, wherein the authorization information comprises a user role.

7. The method of claim 1, wherein the proxy target device comprises a firewall.

8. The method of claim 1, wherein the distributed data store comprises a multi-master cache.

9. The method of claim 1, wherein the first accounting update comprises a stop instruction.

10. The method of claim 9, wherein the stop instruction comprises an instruction to erase session information.

11. The method of claim 1, wherein the first accounting update comprises a request to query a local instance of the distributed data store.

12. A network infrastructure device comprising:
a network interface communicatively coupled to a first network;
a processing device communicatively coupled to the network interface; and
a non-transitory storage medium readable by the processing device and storing instructions, that when executed by the processing device, cause the network infrastructure device to provide functionality of a policy management (PM) node of a plurality of PM nodes of a PM cluster, and to:
receive a first accounting update for a client device from a network authentication server, wherein the network authentication server is associated with the first network, and the first accounting update comprises first information about an existing session corresponding to the client device;
responsive to the first accounting update, determine second information comprising an authorization attribute associated with the client device and update a configured Remote Authentication Dial-In User Service (RADIUS) attribute of a cache based on the authorization attribute;
augment the first information with the second information to provide a second accounting update; and
responsive to the first accounting update, send the second accounting update to a device that is external to the first network, wherein the device does not have access to the cache.

13. The network infrastructure device of claim 12, wherein the cache is shared by the plurality of PM nodes.

14. The network infrastructure device of claim 12, wherein the first accounting update corresponds to a first accounting-request message provided by the client device.

15. The network infrastructure device of claim 12, wherein the authorization attribute comprises a user role.

16. The network infrastructure device of claim 12, wherein, the device comprises a firewall.

17. A non-transitory machine-readable storage medium storing instructions that, when executed by a machine, cause the machine to:
receive, from a network authentication server, a first accounting update for a client device, wherein the client device has an existing user session with the network and the first accounting update corresponds to a request sent by the client responsive to the existing user session;
responsive to receiving the first accounting update, determine an authorization attribute for the client device and cause a configured Remote Authentication Dial-In User Service (RADIUS) attribute stored in a distributed data store to be updated based on the authorization attribute; and
send, as a proxy, a second accounting update to a proxy target device external to the network responsive to the receiving of the first accounting update, wherein the second accounting update comprises information of the first accounting update augmented with the authorization attribute, wherein the proxy target device does not have access to the distributed data store.

18. The non-transitory machine-readable storage medium of claim 17, wherein:
the machine is a node of a plurality of nodes corresponding to a policy manager,
the plurality of nodes sharing the distributed data store.

19. The non-transitory machine-readable storage medium of claim 17, wherein the first accounting update corresponds to an accounting request provided by the client device, and the accounting request corresponds to an attempt by the client device to access a service or a resource of the network.

20. The non-transitory machine-readable storage medium of claim 17, wherein the proxy target device comprises a firewall.

* * * * *